(12) United States Patent
Lee

(10) Patent No.: US 10,197,839 B2
(45) Date of Patent: Feb. 5, 2019

(54) LIQUID CRYSTAL DISPLAY DEVICE AND METHOD OF MANUFACTURING THE SAME

(71) Applicant: LG Display Co., Ltd., Seoul (KR)

(72) Inventor: Sang-Wook Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 57 days.

(21) Appl. No.: 15/363,014

(22) Filed: Nov. 29, 2016

(65) Prior Publication Data

US 2017/0153470 A1   Jun. 1, 2017

(30) Foreign Application Priority Data

Nov. 30, 2015   (KR) .................. 10-2015-0169518

(51) Int. Cl.
| | |
|---|---|
| *G02F 1/1345* | (2006.01) |
| *G02F 1/1334* | (2006.01) |
| *G02F 1/1333* | (2006.01) |
| *G02F 1/1335* | (2006.01) |
| *G02F 1/1343* | (2006.01) |
| *G02F 1/1362* | (2006.01) |
| *G02F 1/1368* | (2006.01) |

(52) U.S. Cl.
CPC .......... *G02F 1/1334* (2013.01); *G02F 1/1368* (2013.01); *G02F 1/133345* (2013.01); *G02F 1/133528* (2013.01); *G02F 1/134309* (2013.01); *G02F 1/134363* (2013.01); *G02F 1/136286* (2013.01); *G02F 1/13624* (2013.01); *G02F 2001/133531* (2013.01); *G02F 2001/136222* (2013.01)

(58) Field of Classification Search
CPC .................. G02F 1/134363; G02F 1/136286
USPC ........................................................ 349/143
See application file for complete search history.

(56) References Cited

U.S. PATENT DOCUMENTS

| | | | | |
|---|---|---|---|---|
| 5,178,571 A | * | 1/1993 | Mase ................... | C09K 19/544 349/89 |
| 2005/0179847 A1 | * | 8/2005 | Miyachi ................ | C09K 19/02 349/141 |
| 2010/0182523 A1 | * | 7/2010 | Woo .................. | G02F 1/134363 349/37 |
| 2010/0296015 A1 | | 11/2010 | Kim et al. | |

(Continued)

OTHER PUBLICATIONS

Extended European Search Report dated Apr. 19, 2017, for European Patent Application No. 16201051.6.

*Primary Examiner* — Christopher Raabe
(74) *Attorney, Agent, or Firm* — Morgan, Lewis and Bockius LLP

(57) ABSTRACT

Provided is a liquid crystal display (LCD) device. An LCD device includes: a gate line on a substrate; first and second data lines crossing the gate line to respectively define first and second pixel regions; and a plurality of electrodes at each of the first and second pixel regions and including a plurality of bars, the plurality of electrodes including a first and a second outermost electrode, wherein the first data line overlaps an upper portion of the first outermost electrode of the first pixel region, and is spaced apart from a lower portion of the first outermost electrode of the first pixel region, and wherein the second data line is spaced apart from an upper portion of the second outermost electrode of the first pixel region, and overlaps a lower portion of the second outermost electrode of the first pixel region.

15 Claims, 14 Drawing Sheets

(56) References Cited

U.S. PATENT DOCUMENTS

| | | | | |
|---|---|---|---|---|
| 2010/0302471 | A1* | 12/2010 | Kim | G02F 1/134363 |
| | | | | 349/37 |
| 2011/0085100 | A1* | 4/2011 | Kim | G02F 1/134363 |
| | | | | 349/41 |
| 2013/0321721 | A1* | 12/2013 | Jin | G02B 27/22 |
| | | | | 349/15 |
| 2014/0184984 | A1 | 7/2014 | Kim et al. | |
| 2014/0211133 | A1* | 7/2014 | Huh | G02F 1/133512 |
| | | | | 349/104 |
| 2014/0247409 | A1* | 9/2014 | Shin | G09G 3/3659 |
| | | | | 349/41 |

\* cited by examiner

C3<<C4

LIQUID CRYSTAL DISPLAY DEVICE AND METHOD OF MANUFACTURING THE SAME

CROSS-REFERENCE TO RELATED APPLICATION(S)

This application claims the benefit of Korean Patent Application No. 10-2015-0169518, filed on Nov. 30, 2015, the entire disclosure of which is hereby incorporated by reference herein.

BACKGROUND

1. Technical Field

The present disclosure relates to a liquid crystal display device (LCD).

2. Discussion of the Related Art

With the advancement of an information society, the display field of displaying electric information signals has been rapidly advanced. Accordingly, as flat display devices having advantages of a thin profile, light weight, and low power consumption, a liquid crystal display device (LCD), a plasma display panel device (PDP), an electroluminescent display device (ELD), a field emission display device (FED), and the like have been introduced and have rapidly replaced a conventional cathode ray tube (CRT). Among the flat display devices, LCDs are most widely used in laptops, monitors, and televisions (TVs) because they are excellent in displaying moving images and have a high contrast ratio.

FIG. 1 is a cross-sectional view illustrating an LCD according to the related art.

With reference to FIG. 1, the related art LCD 10 includes a liquid crystal panel having a first substrate 2 and a second substrate 4 attached to each other with a liquid crystal layer 50 therebetween, and a backlight 60. In detail, a thin film transistor Tr on the first substrate 2 includes a gate electrode 12, a gate insulating layer 13, an active layer 14, ohmic contact layers 15a and 15b, and source and drain electrodes 16 and 17, and is connected to a first electrode 19 in a pixel region P through a contact hole formed in an inter-layered insulating film 18. In addition, a black matrix 32 is below the second substrate 4, and has a lattice shape to surround the pixel region P, such that the black matrix 32 shields a non-display element, such as the thin film transistor Tr, and exposes the first electrode 19.

Further, a color filter 34 is arranged in the lattice-shaped black matrix 32 corresponding to the pixel region P, and a second electrode is arranged to cover the black matrix 32 and the color filter 34. Polarizing plates 20 and 30, each selectively transmitting a predetermined polarized light, are respectively attached below the first substrate 2 and on the second substrate 4.

In addition, a first alignment layer 31a having a surface rubbed in a predetermined direction is between the liquid crystal layer 50 and the first electrode 19, and a second alignment layer 31b having a surface rubbed in a predetermined direction is between the liquid crystal layer 50 and the second electrode 36. Thus, an initial arrangement state and an alignment direction of liquid crystal molecules are uniform. Also, a seal pattern 70 is arranged along edge portions of the first and second substrates 2 and 4 to prevent a leakage of the liquid crystal layer 50.

Because the LCD 10 is not self-luminescent, the backlight 60 is arranged as a light source below the liquid crystal panel to supply light to the liquid crystal panel. A nematic liquid crystal, a smetic liquid crystal, a cholesteric liquid crystal, or the like is used as the liquid crystal layer for the LCD 10, with the nematic liquid crystal is most commonly used.

However, in the related art LCD 10, there is an disadvantage in that an alignment process when attaching the two substrates 2 and 4 is additionally required after the substrates 2 and 4 are individually manufactured. Further, processes of printing and rubbing the alignment layers 31a and 31b to align the liquid crystal are required. Due to these processes, production rate is reduced. Moreover, a gap between the two substrates 2 and 4 needs to be maintained after attaching the substrates 2 and 4 and injecting the liquid crystal between the substrates 2 and 4. If a gap between the two substrates changes by an external pressure or impact, display quality may be degraded.

SUMMARY

Accordingly, the present disclosure is directed to an LCD that substantially obviates one or more of the problems due to limitations and disadvantages of the related art.

An object of the present disclosure is to provide an LCD that can prevent a flicker phenomenon and a light leakage phenomenon.

Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided a liquid crystal display (LCD) device, including: a substrate, a gate line on the substrate, first and second data lines crossing the gate line to respectively define first and second pixel regions, and a plurality of first and second electrodes alternately arranged at each of the first and second pixel regions, each of the first and second electrodes including a plurality of bars, the plurality of first and second electrodes including a first and a second outermost electrode, wherein the first data line overlaps an upper portion of the first outermost electrode of the first pixel region, and is spaced apart from a lower portion of the first outermost electrode of the first pixel region, and wherein the second data line is spaced apart from an upper portion of the second outermost electrode of the first pixel region, and overlaps a lower portion of the second outermost electrode of the first pixel region.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the disclosure.

Figure 1:
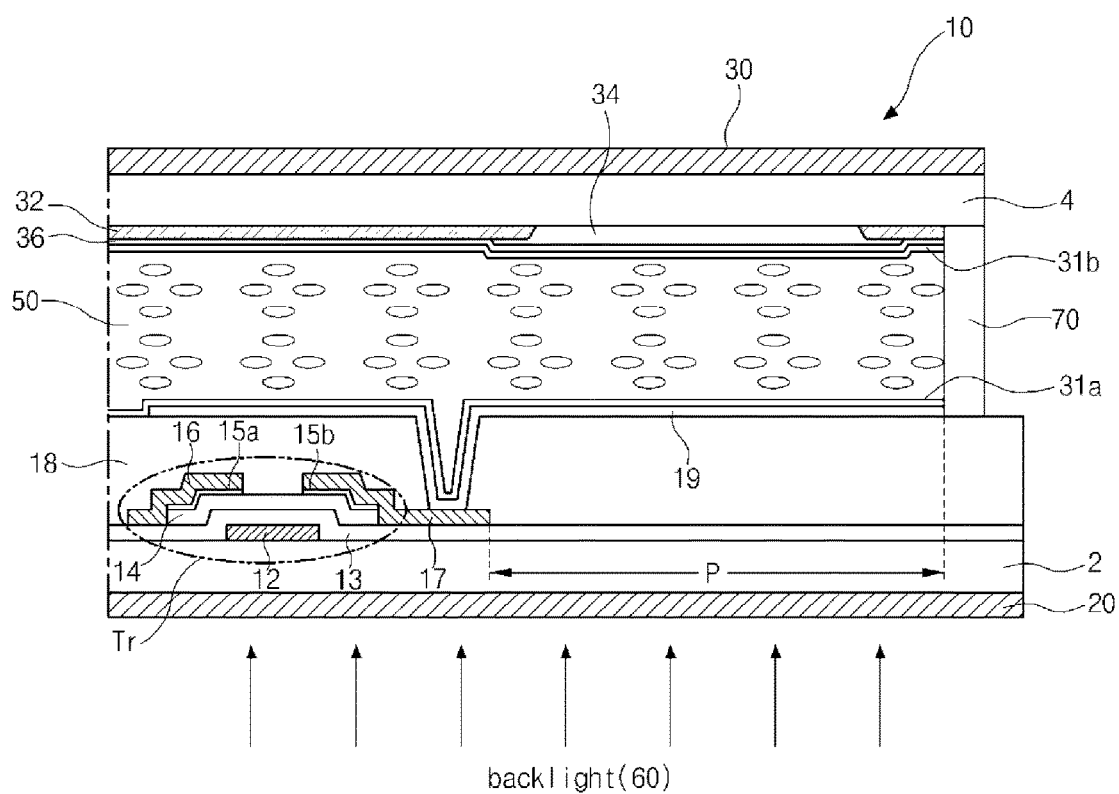
FIG. 1 is a cross-sectional view illustrating an LCD according to the related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Figure 2:
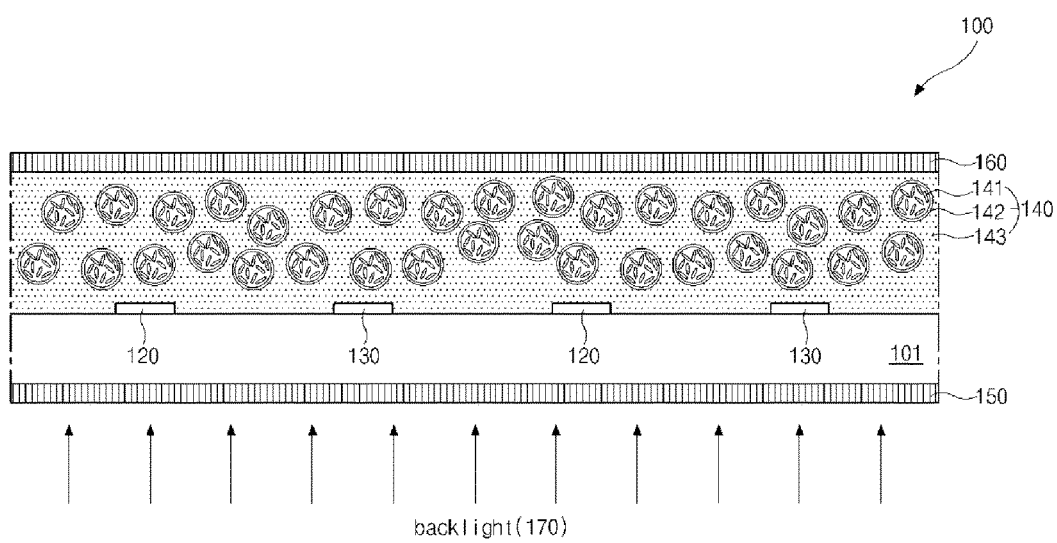
FIG. 2 is a cross-sectional view illustrating an LCD according to a first embodiment.

FIG. 2 is a cross-sectional view illustrating a liquid crystal display (LCD) according to a first embodiment.

With reference to FIG. 2, an LCD 100 may include a substrate 101, first and second electrodes 120 and 130 on the substrate 101, a nano capsule liquid crystal layer 140 on the first and second electrodes 120 and 130, a first polarizing plate 150 below the substrate 101, and a second polarizing plate 160 on the nano capsule liquid crystal layer 140. The nano capsule liquid crystal layer 140 may be formed with nano capsules 142 that are dispersed in a buffer layer 143. The nano capsule 142 may have a size less than a wavelength of visible light and may be filled with liquid crystal molecules 141 that may be randomly arranged.

The nano capsule liquid crystal layer 140 may be formed in a film type over the first and second electrodes 120 and 130. Accordingly, unlike the related art LCD that uses two substrates, the LCD 100 can be manufactured with one substrate 101. Thus, an LCD having light weight and a thin profile can be achieved, and production cost can be reduced.

Furthermore, the nano capsule liquid crystal layer 140 does not have the problem of the related art in that the gap between the related art two substrates goes askew or changes by an external pressure or impact. Thus, when forming the substrate 101 using a flexible material such as a plastic, the nano capsule liquid crystal layer 140 can be effectively applied to a flexible LCD.

Moreover, the nano capsule liquid crystal layer 140 may have an optical isotropy when an electric field is not applied. However, the nano capsule liquid crystal layer 140 may have an optical property such that, when an electric field is applied, the liquid crystal molecules 141 in the nano capsule 142 may be aligned in a direction of the electric field and birefringence of a light incident on the nano capsule liquid crystal layer 140 may be produced. Accordingly, the nano capsule liquid crystal layer 140 can form an optical axis according to an applied electric field, and light can be transmitted by controlling an optical property using this feature.

Further, the first polarizing plate 150 may produce a polarization of light to be incident on the nano capsule liquid crystal layer 140 from the backlight 170. The second polarizing plate 160 may block a light that is incident on the nano capsule liquid crystal layer 140, and then may pass through the nano capsule liquid crystal layer 140 without polarization by a birefringence effect of the nano capsule liquid crystal layer 140.

A polarization axis of the first polarizing plate 150 and a polarization axis of the second polarizing plate 160 may be perpendicular to each other. For example, if the polarization axis of the first polarizing plate 150 may have a 0° or 90° (degree) angle, the polarization axis of the second polarization plate 160 has a 90° or 0° (degree) angle. A principle of operating the LCD 100 including the nano capsule liquid crystal layer 140 is explained below.

First, when an electric field is not induced between the first and second electrodes 120 and 130, the nano capsule liquid crystal layer 140 may pass through a light entering it through the first polarizing plate 150. Thus, the LCD 100 may display a black (or off) state.

In other words, in an off state with no electric field being applied, a light entering the first polarizing plate 150 from the backlight 170 may be selectively transmitted at a specific angle while passing through the first polarization plate 150, then the light entering the nano capsule liquid crystal layer 140 may be transmitted through the nano capsule liquid crystal layer 140 with a minimal scattering phenomenon occurrence, and then may reach the second polarizing plate 160.

Finally, a light passing through the first polarization plate 150 having the polarization axis of, for example, a 0° angle may enters the second polarization plate 160 having the polarization axis of, for example, a 90° angle. Thus, this light may be blocked by the second polarizing plate 160 perpendicular in polarizing axis to the first polarizing plate 150. Therefore, the LCD 100 may display the black (or off) state.

As described above, unlike the related art LCD requiring that a pair of alignment layers are respectively arranged on a pair of substrates opposing to each other, and that a liquid crystal is injected between the substrates and is aligned to have a predetermined pitch and direction, the LCD 100 of the first embodiment can display the black (or off) state using the optical property of the nano capsule liquid crystal layer 140. Thus, the LCD 100 does not require the additional alignment of liquid crystal that is required in the related art. Accordingly, the LCD 100 can eliminate processes of printing and rubbing an alignment layer that the related art LCD (e.g., the LCD 10 of FIG. 1) necessarily requires.

When an electric field is induced between the first and second electrodes 120 and 130, the nano capsule liquid crystal layer 140 may rotate a polarization axis of a light entering the nano capsule liquid crystal layer 140 through the first polarization plate 150 by a 90° angle. Thus, the LCD 100 may display a white (or on) state. In detail, in the on state with the electric field being induced, because the liquid crystal molecules 141 in the nano capsule 142 may be arranged in parallel with a direction of the electric field, a birefringence effect by the alignment of the liquid crystal molecules 141 may be produced.

In this case, a light entering the nano capsule liquid crystal layer 140 through the first polarizing plate 150 may change in polarization by the birefringence effect of the nano capsule liquid crystal layer 140. When a retardation, e.g., $\Delta n*d$, of the nano capsule liquid crystal layer 140 meets a $\lambda/2$ condition of a light incident thereon, a polarization axis of the incident light is rotated by a 90° angle. Thus, this light may not be absorbed by the second polarizing plate 160 perpendicular in polarization axis to the first polarizing plate 150, and may pass through the second polarizing plate 160. Thus, the LCD 100 may display the white (or on) state.

Figure 3:
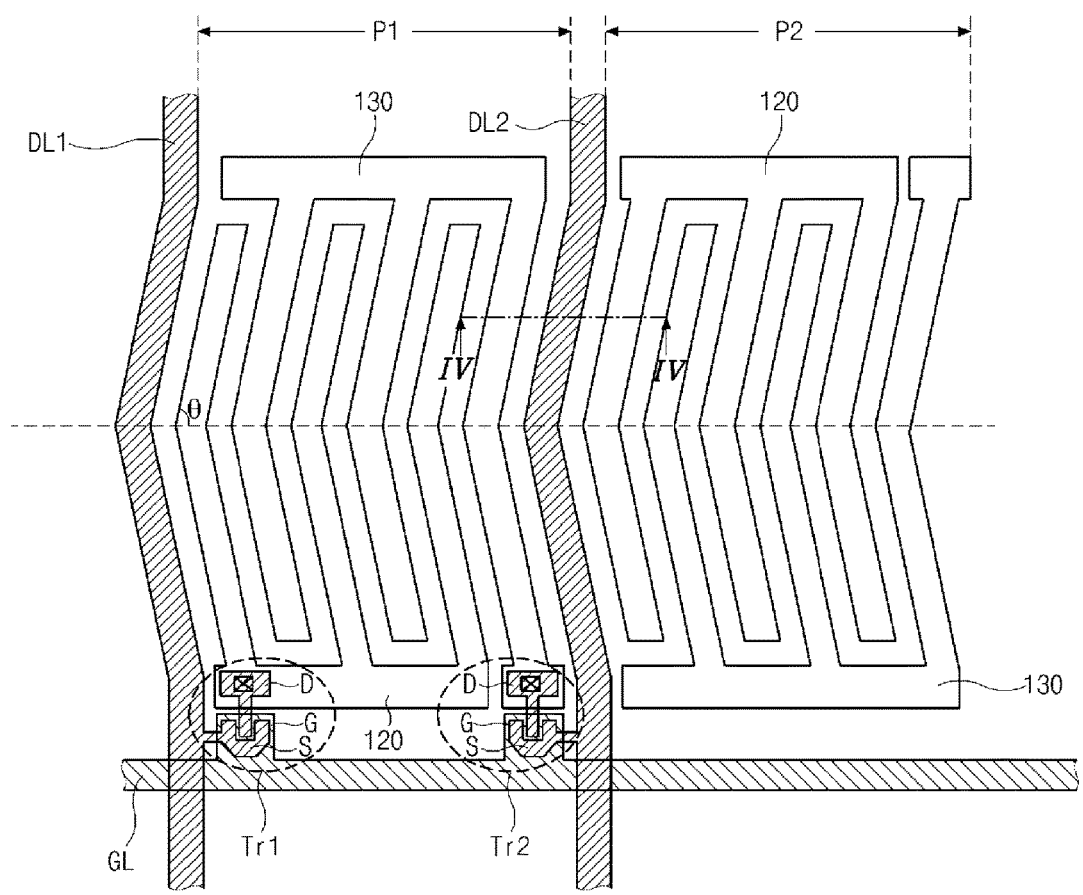
FIG. 3 is a plan view illustrating an LCD according to the first embodiment.

FIG. 3 is a plan view illustrating an LCD according to the first embodiment.

With reference to FIG. 3, the LCD 100 may include a gate line GL on the substrate 101, first and second data lines DL1 and DL2 crossing the gate line GL to respectively define first and second pixel regions P1 and P2, first and second electrodes 120 and 130 in each of the first and second pixel regions P1 and P2, and first and second thin film transistors Tr1 and Tr2 in the first pixel region P1.

In detail, the first and second electrodes 120 and 130 may each include a plurality of bars, and may be alternately arranged and spaced apart from each other. In a plane view, the first and second electrodes 120 and 130 may have a symmetrically bent shape with respect to a center of the first and second pixel regions P1 and P2. Accordingly, the first and second data lines DL1 and DL2 may also have a symmetrically bent shape with respect to the center of the first and second pixel regions P1 and P2.

In other words, the first and second electrodes 120 and 130 and the first and second data lines DL1 and DL2 may be slanted at an angle θ with respect to a horizontal line extended along the center of the first and second pixel regions P1 and P2. For example, the angle θ may be 30° to 90°. In one example, the angle θ may be 45°. Accordingly, occurrence of a color difference by change of a viewing angle can be prevented.

Further, the first thin film transistor Tr1 may be connected to the gate line GL and the first data line DL1, and may supply a first data voltage to the first electrode 120 of the first pixel region P1. The second thin film transistor Tr2 may be connected to the gate line GL and the second data line DL2, and may supply a second data voltage, which may have a level that is opposite that of a level of the first data voltage, to the second electrode 130 of the first pixel region P1.

The first thin film transistor Tr1 may include a gate electrode G connected to the gate line GL, a source electrode S connected to the first data line DL1, and a drain electrode D connected to the first electrode 120. The second thin film transistor Tr2 may include a gate electrode G connected to the gate line GL, a source electrode S connected to the second data line DL2, and a drain electrode D connected to the second electrode 130.

A method of driving the LCD 100 is explained with reference to FIG. 3.

First, in the related art LCD, only a data voltage supplied from a data line to a first electrode is swung. In other words, with respect to a constant common voltage supplied from a common line, as a reference, a data voltage supplied from a data line to a first electrode alternates between positive and negative voltages.

However, in the LCD 100 of the first embodiment, both the first and second data voltages, respectively supplied from the first and second data lines DL1 and DL2 to the first and second electrodes 120 and 130, may be swung. In other words, the first data voltage may be supplied from the first data line DL1 to the first electrode 120 alternating between positive and negative voltages with respect to a constant common voltage, and the second data voltage having a level opposite to the level of the first data voltage may be supplied from the second data line DL2 to the second electrode 130. Thus, because the LCD 100 of the first embodiment may apply two times the data voltage of the related art LCD to each of the first and second pixel regions P1 and P2, a light transmittance of the nano capsule liquid crystal layer (e.g., 140 of the FIG. 2 example) can be improved.

The first and second electrodes 120 and 130 may be formed at the same layer and of the same material. When forming the first and second electrodes 120 and 130, a misalignment may occur.

Figure 4A:
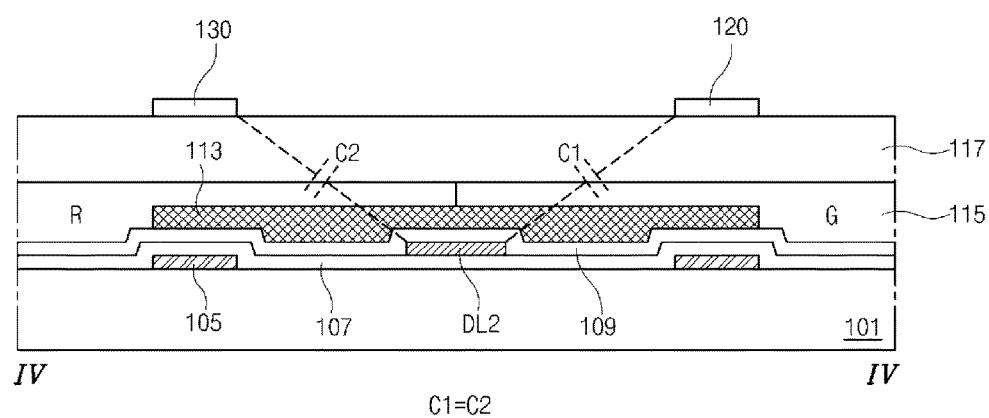
FIGS. 4A to 4C are cross-sectional views taken along a line IV-IV of FIG. 3.
Figure 4B:
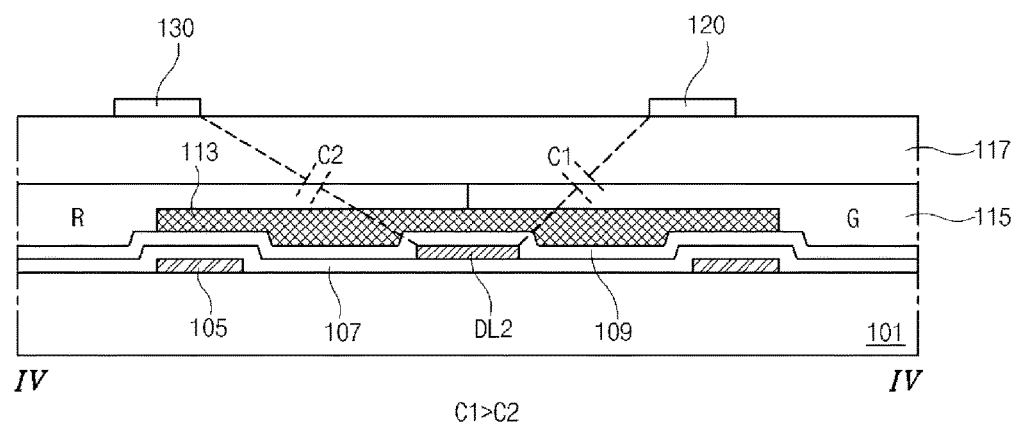
Figure 4C:
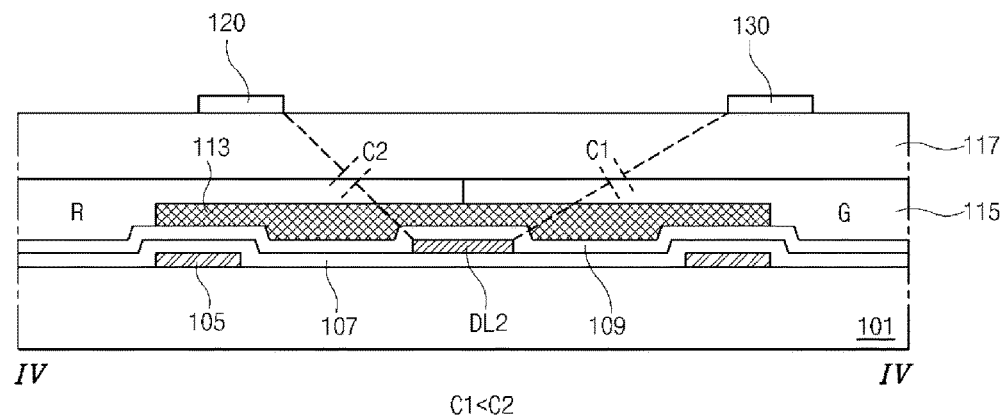

FIGS. 4A to 4C are cross-sectional views taken along a line IV-IV of FIG. 3.

FIG. 4A shows an example in which a misalignment does not occur and the first and second electrodes 120 and 130 are formed at correct positions. FIG. 4B shows an example in which a misalignment occurs and the first and second electrodes 120 and 130 are shifted toward the left. FIG. 4C shows an example in which a misalignment occurs and the first and second electrodes 120 and 130 are shifted toward the right.

With reference to FIGS. 4A to 4C, the LCD 100 may include a gate insulating layer 107 on the substrate 101, the second data line DL2 on the gate insulating layer 107 between the first and second pixel regions P1 and P2, an inter-layered insulating film 109 on the second data line DL, a color filter 115 on the inter-layered insulating film 109, a passivation layer 117 on the color filter 115, and the first and second electrodes 120 and 130 on the passivation layer 117.

The LCD 100 may further include common lines 105 between the substrate 101 and the gate insulating layer 107. The common lines 105 may be spaced apart from respective sides of the second data line DL2, and may be parallel with the second data line DL2.

In detail, the color filters 115 may display red (R), green (G), and blue (B) in respective pixel regions. As shown in the example drawings, the color filters 115 of the first and second pixel regions P1 and P2 may respectively display red (R) and green (G). Embodiments are not limited thereto.

Further, a black matrix 113 may be between the inter-layered insulating film 109 and the color filter 115. The black matrix 113 may be located between neighboring pixel regions P1 and P2 to cover non-display elements between the pixel regions P1 and P2, and may prevent light leakage between the common lines 105 and the second data line DL2.

With reference to FIG. 4A, in an example in which the misalignment does not occur when forming the first and second electrodes 120 and 130, and the first and second electrodes 120 and 130 are located at correct positions, a first capacitance C1 (produced between the outermost first electrode 120 of the second pixel region P2 and the second data line DL2) and a second capacitance C2 (produced between the outermost second electrode 130 of the first pixel region P1 and the second data line DL2 may be equal to each other) (i.e., C1=C2).

In other words, a distance between the outermost first electrode 120 of the second pixel region P2 and the second data line DL2, and a distance between the outermost second electrode 130 of the first pixel region P1 and the second data line DL2 may also be equal to each other. Thus, as discussed above, the first capacitance C1 and the second capacitance C2 may become equal to each other.

However, with reference to FIG. 4B, in an example in which the misalignment occurs when forming the first and second electrodes 120 and 130 and the first and second electrodes 120 and 130 are shifted to the left, a first capacitance C1 (produced between the outermost first electrode 120 of the second pixel region P2 and the second data line DL2) may be greater than a second capacitance C2 (produced between the outermost second electrode 130 of the first pixel region P1 and the second data line DL2) (i.e., C1>C2).

A capacitance is in inverse proportion to a distance between electrodes. Because, in the FIG. 4B example, a distance between the outermost first electrode 120 of the second pixel region P2 and the second data line DL2 is less than a distance between the outermost second electrode 130 of the first pixel region P1 and the second data line DL2, the first capacitance C1 may become greater than the second capacitance C2.

Further, with reference to FIG. 4C, in an example in which the misalignment occurs when forming the first and second electrodes 120 and 130 and the first and second electrodes 120 and 130 are shifted to the right, a first capacitance C1 (produced between the outermost first electrode 120 of the second pixel region P2 and the second data line DL2) may be less than a second capacitance C2 (produced between the outermost second electrode 130 of the first pixel region P1 and the second data line DL2) (i.e., C1<C2).

In other words, because, in the FIG. 4C example, a distance between the outermost first electrode 120 of the second pixel region P2 and the second data line DL2 is greater than a distance between the outermost second electrode 130 of the first pixel region P1 and the second data line DL2, the first capacitance C1 may be less than the second capacitance C2.

The capacitances between the outermost first and second electrodes 120 and 130 of the first and second pixel regions P1 and P2 and the corresponding data line may influence the data voltages supplied to the first electrode 120 and the second electrode 130. Accordingly, due to the difference of the capacitances, the data voltage applied between the first and second electrodes 120 and 130 in a frame inversion driving may be changed per frame. Thus, a flicker phenomenon may occur. To prevent the flicker phenomenon, the outermost first electrode 120 of the second pixel region P2 and the outermost second electrode 130 of the first pixel region P1 may be formed at a distance such that the capacitances are not produced. However, this situation may cause a reduction of aperture ratio.

Figure 5:
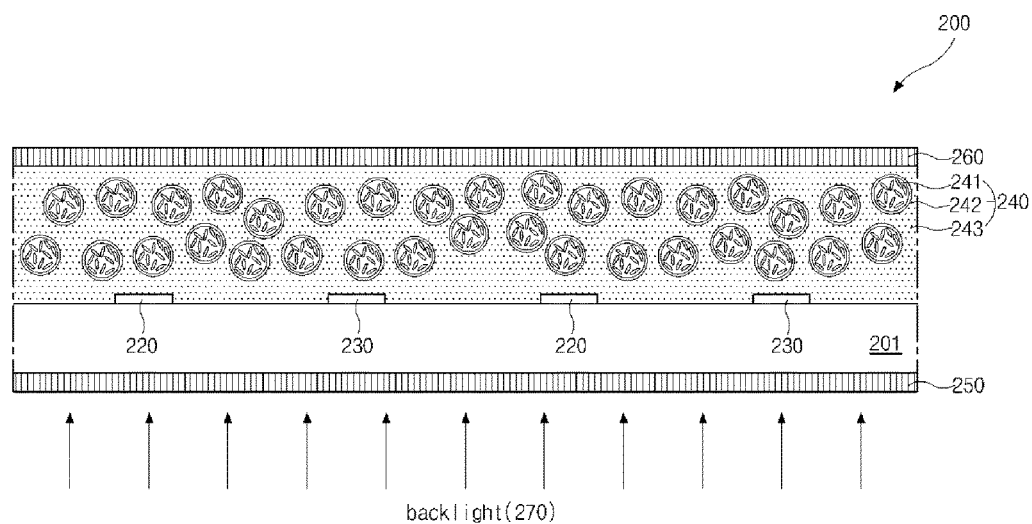
FIG. 5 is a cross-sectional view illustrating an LCD according to a second embodiment.

FIG. 5 is a cross-sectional view illustrating an LCD according to a second embodiment.

With reference to FIG. 5, an LCD 200 may include a substrate 201, first and second electrodes 220 and 230 on the substrate 201, a nano capsule liquid crystal layer 240 on the first and second electrodes 220 and 230, a first polarizing plate 250 below the substrate 201, and a second polarizing plate 260 on the nano capsule liquid crystal layer 240. The nano capsule liquid crystal layer 240 may be formed with nano capsules 242 that may be dispersed in a buffer layer 243. The nano capsule 242 may have a size less than a wavelength of visible light and may be filled with liquid crystal molecules 241 that may be randomly arranged.

The nano capsule liquid crystal layer 240 may be formed in a film type over the first and second electrodes 220 and 230. Accordingly, unlike the related art LCD using two substrates, the LCD 200 of the second embodiment can be manufactured with one substrate 201. Thus, an LCD having light weight and a thin profile can be achieved, and production cost can be reduced.

Further, the nano capsule liquid crystal layer 240 does have the problem of the related art in that the gap between the related art two substrates goes askew or changes by an external pressure or impact. Thus, when forming the substrate 201 using a flexible material such as a plastic, the nano capsule liquid crystal layer 240 can be effectively applied to a flexible LCD.

Further, the nano capsule liquid crystal layer 240 may have an optical isotropy when an electric field is not applied. However, the nano capsule liquid crystal layer 240 may have an optical property such that, when an electric field is applied, the liquid crystal molecules 241 in the nano capsule 242 may be aligned in a direction of the electric field, and birefringence of a light incident on the nano capsule liquid crystal layer 240 may be produced. Accordingly, the nano capsule liquid crystal layer 240 can form an optical axis according to an applied electric field. Also, by controlling an optical property using the electric field, a light can be transmitted.

Further, the first polarizing plate 250 may produce a polarization of light to be incident on the nano capsule liquid crystal layer 240 from the backlight 270. The second polarizing plate 260 may block light that is incident on the nano capsule liquid crystal layer 240, and then may pass through the nano capsule liquid crystal layer 240 without polarization by a birefringence effect of the nano capsule liquid crystal layer 240.

A polarization axis of the first polarizing plate 250 and a polarization axis of the second polarizing plate 260 may be perpendicular to each other. For example, if the polarization axis of the first polarizing plate 250 has a 0° or 90° (degree) angle, the polarization axis of the second polarization plate 260 may have a 90° or 0° (degree) angle. A principle of operating the LCD 200 including the nano capsule liquid crystal layer 240 is explained below.

First, when an electric field is not induced between the first and second electrodes 220 and 230, the nano capsule liquid crystal layer 240 may pass through a light entering it through the first polarizing plate 250. Thus, the LCD 200 may display a black (or off) state.

In other words, in the off state with no electric field being applied, a light entering the first polarizing plate 250 from the backlight 270 may be selectively transmitted at a specific angle while passing through the first polarization plate 250. Then the light entering the nano capsule liquid crystal layer 240 may be transmitted through the nano capsule liquid crystal layer 240 with a scattering phenomenon hardly happening, and then may reach the second polarizing plate 260.

Finally, light passing through the first polarization plate 250 having the polarization axis of, for example, 0° angle may enter the second polarization plate 260 having the polarization axis of, for example, a 90° angle. Thus, this light may be blocked by the second polarizing plate 260 perpendicular in polarizing axis to the first polarizing plate 250. As such, the LCD 200 may display the black (or off) state.

As described above, unlike the related art LCD requiring that a pair of alignment layers are respectively arranged on a pair of substrates opposing to each other, and a liquid crystal is injected between the substrates and is aligned to have a predetermined pitch and direction, the LCD 200 of the second embodiment can display the black (or off) state using the optical property of the nano capsule liquid crystal layer 240. Thus, the LCD 200 does not require an additional alignment of liquid crystal, which is required in the related art. Accordingly, the LCD 200 of the second embodiment can eliminate processes of printing and rubbing an alignment layer that the related art LCD necessarily requires.

When an electric field is induced between the first and second electrodes 220 and 230, the nano capsule liquid crystal layer 240 may rotate a polarization axis of a light entering the nano capsule liquid crystal layer 240 through the first polarization plate 250 by a 90° angle. Thus, the LCD 200 may display a white (or on) state. In detail, in the on state with the electric field being induced, because the liquid crystal molecules 241 in the nano capsule 242 may be arranged in parallel with a direction of the electric field, a birefringence effect by the alignment of the liquid crystal molecules 241 may be produced.

In this case, a light entering the nano capsule liquid crystal layer 240 through the first polarizing plate 250 may change in polarization by the birefringence effect of the nano capsule liquid crystal layer 240. When a retardation, e.g., Δn*d, of the nano capsule liquid crystal layer 240 meets a λ/2 condition of a light incident thereon, a polarization axis of the incident light may be rotated by a 90° angle. Thus, this light may not be absorbed by the second polarizing plate 260 perpendicular in polarization axis to the first polarizing plate 250, and may pass through the second polarizing plate 260. Thus, the LCD 200 may display the white (or on) state.

Figure 6:
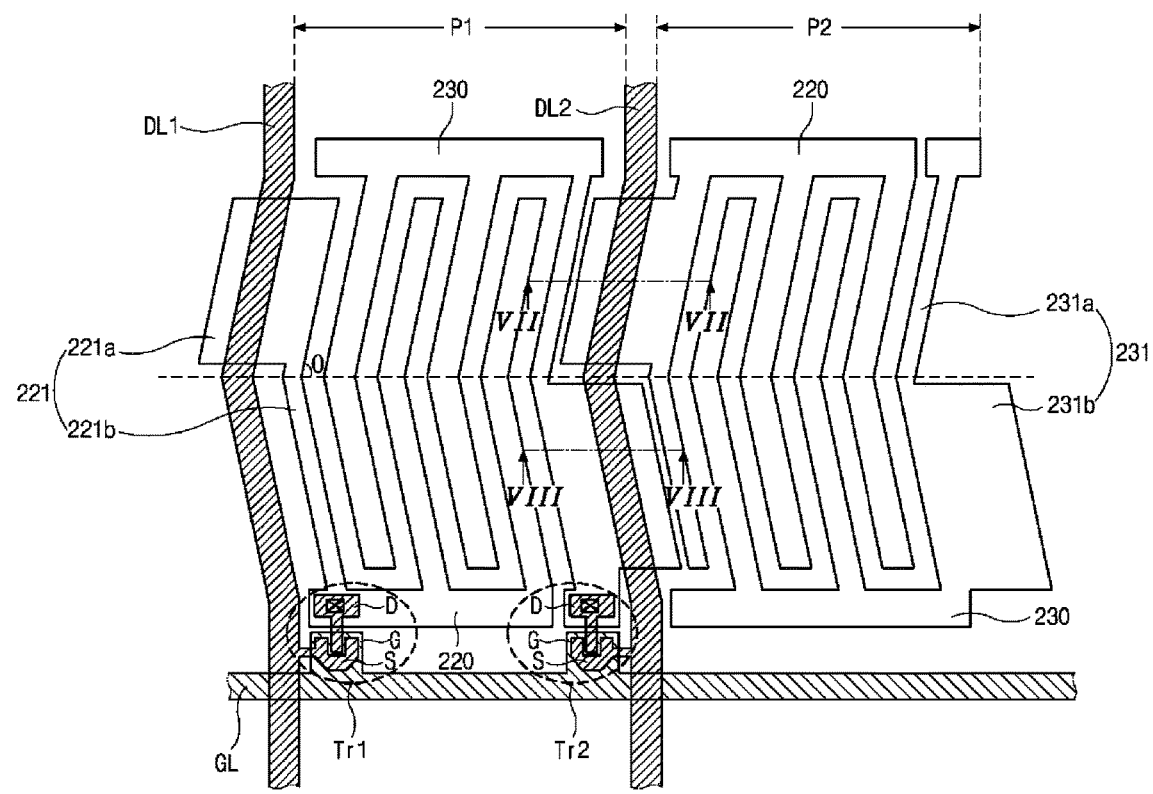
FIG. 6 is a plan view illustrating an LCD according to the second embodiment.

FIG. 6 is a plan view illustrating an LCD according to the second embodiment.

With reference to FIG. 6, the LCD 200 may include a gate line GL on the substrate 201, first and second data lines DL1 and DL2 crossing the gate line GL to respectively define first and second pixel regions P1 and P2, first and second electrodes 220 and 230 in each of the first and second pixels P1 and P2, and first and second thin film transistors Tr1 and Tr2 in the first pixel region P1.

In detail, the first and second electrodes 220 and 230 may each include a plurality of bars, and may be alternately arranged and spaced apart from each other. In a plane view, the first and second electrodes 220 and 230 may have a symmetrically bent shape with respect to a center of the first and second pixel regions P1 and P2. Accordingly, the first and second data lines DL1 and DL2 may also have a symmetrically bent shape with respect to the center of the first and second pixel regions P1 and P2.

In other words, the first and second electrodes 220 and 230 and the first and second data lines DL1 and DL2 may be slanted at an angle θ with respect to a horizontal line extended along the center of the first and second pixel regions P1 and P2. For example, the angle θ may be 30° to 90°. In one example, the angle θ may be 45 degrees.

Accordingly, an occurrence of a color difference by change of a viewing angle can be prevented.

Further, a first outermost electrode 221 (an outermost electrode of each pixel region) of the first electrode 220 may be divided into an upper portion 221a and a lower portion 221b located at an upper side and a lower side with respect to the center of the first and second pixel regions P1 and P2. A second outermost electrode 231 (an outermost electrode of each pixel region) of the second electrode 230 may be divided into an upper portion 231a and a lower portion 231b located at an upper side and a lower side with respect to the center of the first and second pixel regions P1 and P2.

The upper portion 221a of the first outermost electrode 221 of each of the first and second pixel regions P1 and P2 may overlap each of the first and second data lines DL1 and DL2. The lower portion 221b of the first outermost electrode 221 of each of the first and second pixel regions P1 and P2 may be spaced apart from each of the first and second data lines DL1 and DL2. The upper portion 231a of the second outermost electrode 231 of the first pixel region P1 may be spaced apart from the second data line DL2. The lower portion 2231b of the second outermost electrode 231 of the first pixel region P1 may overlap the second data line DL2.

The upper portion 221a and the lower portion 221b of the first outermost electrode 221 may change positions. The upper portion 231a and the lower portion 231b of the second outermost electrode 231 may change positions. The lower portion 231b of the second outermost electrode 231 of the first pixel region P1 may extend into the second pixel region P2. The upper portion 221a of the first outermost electrode 221 of the second pixel region P2 may extend into the first pixel region P1.

The upper portion 221a of the first outermost electrode 221 of each of the first and second pixel regions P1 and P2 may have an area greater than that of the lower portion 221b of the first outermost electrode 221 of each of the first and second pixel regions P1 and P2. The lower portion 231b of the second outermost electrode 231 of each of the first and second pixel regions P1 and P2 may have an area greater than that of the upper portion 231a of the second outermost electrode 231 of each of the first and second pixel regions P1 and P2.

Further, the first thin film transistor Tr1 may be connected to the gate line GL and the first data line DL1, and supply a first data voltage to the first electrode 220 of the first pixel region P1. The second thin film transistor Tr2 may be connected to the gate line GL and the second data line DL2, and may supply a second data voltage, which may have a level opposite to a level of the first data voltage, to the second electrode 230 of the first pixel region P1.

The first thin film transistor Tr1 may include a gate electrode G connected to the gate line GL, a source electrode S connected to the first data line DL1, and a drain electrode D connected to the first electrode 220. The second thin film transistor Tr2 may include a gate electrode G connected to the gate line GL, a source electrode S connected to the second data line DL2, and a drain electrode D connected to the second electrode 230.

A method of driving the LCD 200 is explained with reference to FIG. 6.

First, in the related art LCD, only a data voltage supplied from a data line to a first electrode is swung. In other words, with respect to a constant common voltage supplied from a common line, as a reference, a data voltage supplied from a data line to a first electrode alternates between positive and negative voltages.

However, in the LCD 200 of the second embodiment, both the first and second data voltages respectively supplied from the first and second data lines DL1 and DL2 to the first and second electrodes 220 and 230 may be swung. In other words, the first data voltage may be supplied from the first data line DL1 to the first electrode 220 alternating between positive and negative voltages with respect to a constant common voltage, and the second data voltage having a level opposite to the level of the first data voltage may be supplied from the second data line DL2 to the second electrode 230. Thus, because the LCD 200 of the second embodiment may apply two times the data voltage of the related art LCD to each of the first and second pixel regions P1 and P2, a light transmittance of the nano capsule liquid crystal layer (e.g., 240 of the FIG. 5 example) can be improved.

Although not shown in FIG. 6, a common line (e.g., 205 of the FIG. 7A example) may be arranged at a separate region between the second outermost electrode 231 of the first pixel region P1 and the first outermost electrode 221 of the second pixel region P1. In detail, the common lines (e.g., 205 of the FIG. 7A example) may be respectively spaced apart from both sides of the second data line DL2, may be parallel with the second data line DL2, and may be connected to each other between the upper portion 221a of the first outermost electrode 221 of the second pixel region P2 and the lower portion 2231b of the second outermost electrode 231 of the first pixel region P1.

Figure 7A:
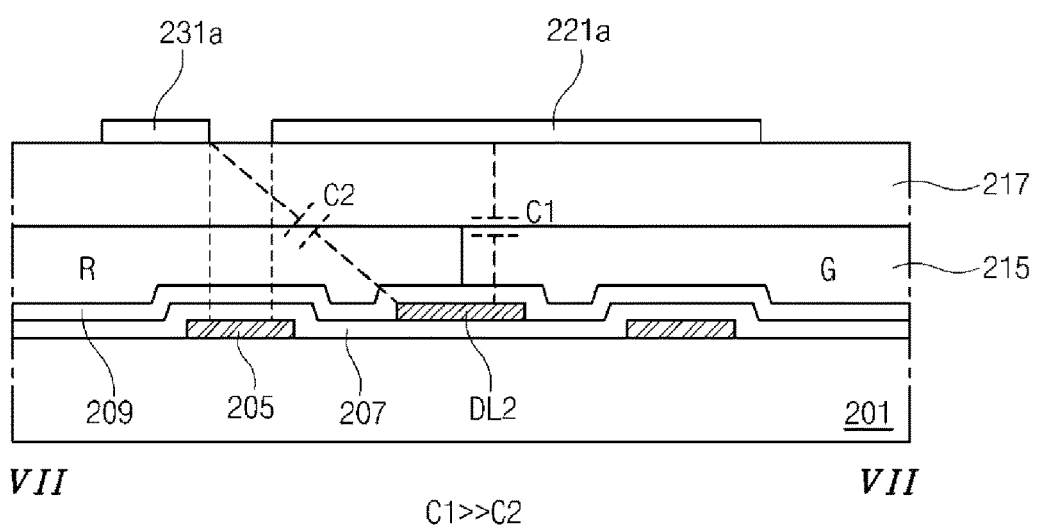
FIGS. 7A to 7C are cross-sectional views taken along line VII-VII of FIG. 6.

Because of this configuration of the common lines (e.g., 205 of the FIG. 7A example), even though a black matrix (e.g., 113 of the FIG. 4A example) may not be formed between the first and second pixel regions P1 and P2, light leakage at the separate region between the second outermost electrode 231 of the first pixel region P1 and the first outermost electrode 221 of the second pixel region P2 can be prevented by the common lines (e.g., 205 of the FIG. 7A example). The common line (e.g., 205 of the FIG. 7A example) may be formed at the same layer and of the same material as the gate line GL. Accordingly, the black matrix can be eliminated, and production processes can be simplified and production costs can be reduced.

The first and second electrodes 220 and 230 may be formed at the same layer and of the same material. When forming the first and second electrodes 220 and 230, a misalignment may occur.

Figure 7B:
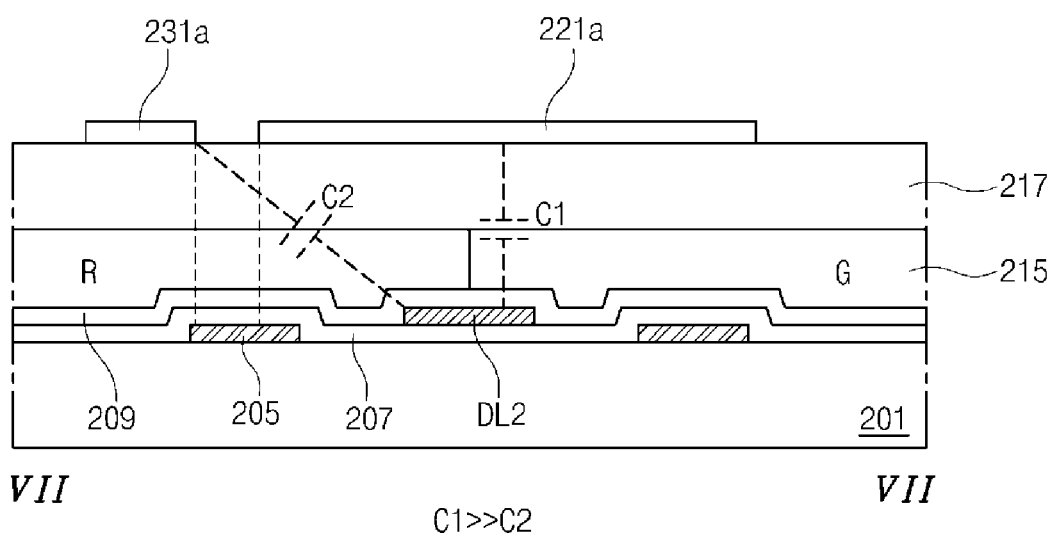
Figure 7C:
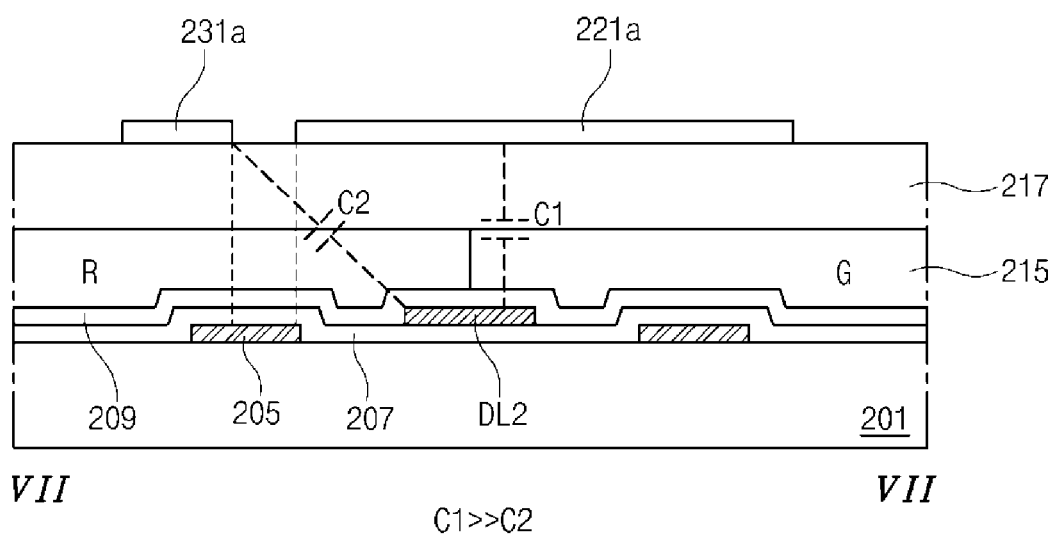

FIGS. 7A to 7C are cross-sectional views taken along a line VII-VII of FIG. 6.

Figure 8A:
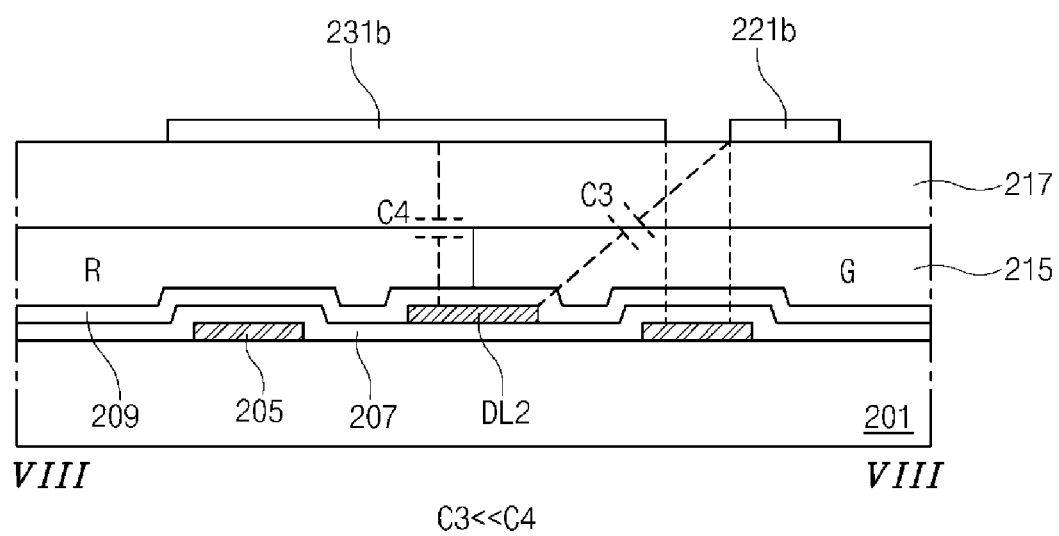
FIGS. 8A to 8C are cross-sectional views taken along line VIII-VIII of FIG. 6.
Figure 8B:
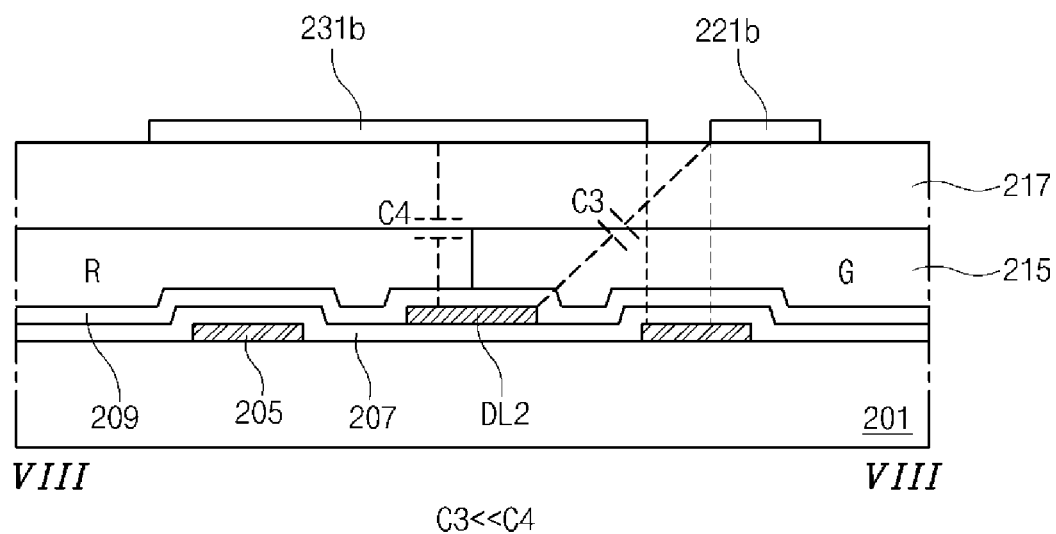
Figure 8C:
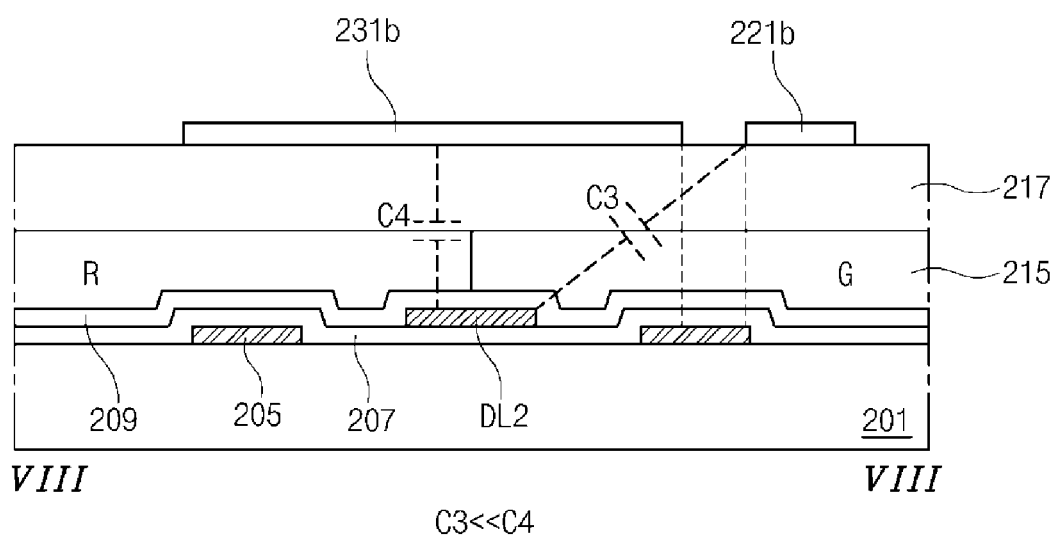

FIGS. 8A to 8C are cross-sectional views taken along a line VIII-VIII of FIG. 6.

In detail, FIGS. 7A and 8A show an example in which a misalignment does not occur and the first and second electrodes 220 and 230 are formed at correct positions. FIGS. 7B and 8B show an example in which a misalignment occurs and the first and second electrodes 220 and 230 are shifted to the left. FIGS. 7C and 8C show an example in which a misalignment occurs and the first and second electrodes 220 and 230 are shifted to the right.

With reference to FIGS. 7A-8C, the LCD 200 may include a gate insulating layer 207 on the substrate 201, the second data line DL2 on the gate insulating layer 207 between the first and second pixel regions P1 and P2, an inter-layered insulating film 209 on the second data line DL, a color filter 215 on the inter-layered insulating film 209, a passivation layer 217 on the color filter 215, and the first and second electrodes 220 and 230 on the passivation layer 217. The first electrode 220 may include a first outermost electrode 221 (e.g., 221a and 221b) as a outermost electrode part at each of the first and second pixel regions P1 and P2.

The second electrode 230 may include a second outermost electrode 231 (e.g., 231a and 231b) as an outermost electrode part at each of the first and second pixel regions P1 and P2.

The LCD 200 may further include the common lines 205 between the substrate 201 and the gate insulating layer 207. The common lines 205 may be respectively spaced apart from both sides of the second data line DL2, and may be parallel with the second data line DL2.

In detail, the color filters 215 may display red (R), green (G), and blue (B) in respective pixel regions. As shown in the drawings, the color filters 215 of the first and second pixel regions P1 and P2 may respectively display red (R) and green (G). Embodiments are not limited thereto.

With reference to FIGS. 7A and 8A, in an example in which the misalignment does not occur when forming the first and second electrodes 220 and 230 and the first and second electrodes 220 and 230 are located at correct positions, a sum of a first capacitance C1 (produced between the upper portion 221a of the first outermost electrode 221 of the second pixel region P2 and the second data line DL2) and a third capacitance C3 (produced between the lower portion 221b of the first outermost electrode 221 of the second pixel region P2 and the second data line DL2) may be equal to a sum of a second capacitance C2 (produced between the upper portion 231a of the second outermost electrode 231 of the first pixel region P1 and the second data line DL2) and a fourth capacitance C4 (produced between the lower portion 2231b of the second outermost electrode 231 of the first pixel region P1 and the second data line DL2) (i.e., C1+C3=C2+C4).

In other words, because a distance and an overlap area between the upper portion 221a of the first outermost electrode 221 and the second data line DL2 may be equal to a distance and an overlap area between the lower portion 231b of the second outermost electrode 231 and the second data line DL2, the first capacitance C1 may be equal to the fourth capacitance C4 (i.e., C1=C4). Because a distance between the upper portion 231a of the second outermost electrode 231 and the second data line DL2 may be equal to a distance between the lower portion 221b of the first outermost electrode 221 and the second data line DL2, the second capacitance C2 may be equal to the third capacitance C3 (i.e., C2=C3). Because a capacitance is in inverse proportion to a distance between electrodes and is in proportion to an overlap area between electrodes, the first capacitance C1 may be much greater than the second capacitance C2 (i.e., C1>>C2) and the fourth capacitance C4 may be much greater than the third capacitance C3 (i.e., C4>>C3).

Further, with reference to FIGS. 7B and 8B, in an example in which the misalignment occurs when forming the first and second electrodes 220 and 230 and the first and second electrodes 220 and 230 are shifted toward the left, a sum of a first capacitance C1 (produced between the upper portion 221a of the first outermost electrode 221 of the second pixel region P2 and the second data line DL2) and a third capacitance C3 (produced between the lower portion 221b of the first outermost electrode 221 of the second pixel region P2 and the second data line DL2) may be very close to a sum of a second capacitance C2 (produced between the upper portion 231a of the second outermost electrode 231 of the first pixel region P1 and the second data line DL2) and a fourth capacitance C4 (produced between the lower portion 231b of the second outermost electrode 231 of the first pixel region P1 and the second data line DL2) (i.e., C1+C3≈C2+C4).

In other words, because a distance and an overlap area between the upper portion 221a of the first outermost electrode 221 and the second data line DL2 may be equal to a distance and an overlap area between the lower portion 231b of the second outermost electrode 231 and the second data line DL2, the first capacitance C1 may be equal to the fourth capacitance C4 (i.e., C1=C4). Because a distance between the upper portion 231a of the second outermost electrode 231 and the second data line DL2 may be greater than a distance between the lower portion 221b of the first outermost electrode 221 and the second data line DL2, the second capacitance C2 may be less than the third capacitance C3 (i.e., C2<C3). Because a capacitance is in inverse proportion to a distance between electrodes and is in proportion to an overlap area between electrodes, the first capacitance C1 may be much greater than the second capacitance C2 (i.e., C1>>C2) and the fourth capacitance C4 may be much greater than the third capacitance C3 (i.e., C4>>C3).

Accordingly, because the second and third capacitances C2 and C3, which may be much less than the first and fourth capacitances C1 and C4, are negligible, the sum of the first and third capacitances C1 and C3 may be almost equal to the sum of the second and fourth capacitances C2 and C4 (i.e., C1+C3≈C2+C4). In other words, even though the second and third capacitances C2 and C3 may be changed by the misalignment, due to the first and fourth capacitances C1 and C4 being much greater than the second and third capacitances C2 and C3, the changed second and third capacitances C2 and C3 may not substantially influence the corresponding capacitance sums.

Further, with reference to FIGS. 7C and 8C, in an example in which the misalignment occurs when forming the first and second electrodes 220 and 230 and the first and second electrodes 220 and 230 are shifted to the right, a sum of a first capacitance C1 (produced between the upper portion 221a of the first outermost electrode 221 of the second pixel region P2 and the second data line DL2) and a third capacitance C3 (produced between the lower portion 221b of the first outermost electrode 221 of the second pixel region P2 and the second data line DL2) may be very close to a sum of a second capacitance C2 (produced between the upper portion 231a of the second outermost electrode 231 of the first pixel region P1 and the second data line DL2) and a fourth capacitance C4 (produced between the lower portion 231b of the second outermost electrode 231 of the first pixel region P1 and the second data line DL2) (i.e., C1+C3≈C2+C4).

In other words, because a distance and an overlap area between the upper portion 221a of the first outermost electrode 221 and the second data line DL2 may be equal to a distance and an overlap area between the lower portion 231b of the second outermost electrode 231 and the second data line DL2, the first capacitance C1 may be equal to the fourth capacitance C4 (i.e., C1=C4). Because a distance between the upper portion 231a of the second outermost electrode 231 and the second data line DL2 may be less than a distance between the lower portion 221b of the first outermost electrode 221 and the second data line DL2, the second capacitance C2 may be greater than the third capacitance C3 (i.e., C2>C3). Because a capacitance is in inverse proportion to a distance between electrodes and is in proportion to an overlap area between electrodes, the first capacitance C1 may be much greater than the second capacitance C2 (i.e., C1>>C2) and the fourth capacitance C4 may be much greater than the third capacitance C3 (i.e., C4>>C3).

Accordingly, because the second and third capacitances C2 and C3, which may be much less than the first and fourth capacitances C1 and C4, are negligible, the sum of the first and third capacitances C1 and C3 may be almost equal to the sum of the second and fourth capacitances C2 and C4 (i.e., C1+C3≈C2+C4). In other words, even though the second and third capacitances C2 and C3 may be changed by the misalignment, due to the first and fourth capacitances C1 and C4 being much greater than the second and third capacitances C2 and C3, the changed second and third capacitances C2 and C3 may not substantially influence the corresponding capacitance sums.

As described above, even though the misalignment may occur when forming the first and second electrodes 220 and 230, the capacitance between the first outermost electrode 221 (e.g., 221a and 221b) and the data line and the capacitance between the second outermost electrode 231 (e.g., 231a and 231b) and the data line may be substantially equal to each other in each pixel region. Accordingly, a flicker phenomenon, which may be caused by the data voltage applied between the first and second electrodes 220 and 230 in a frame inversion driving being changed per frame due to the difference capacitances, can be prevented.

Further, in preventing the flicker phenomenon, the second outermost electrode 231 of the first pixel region P1 and the first outermost electrode 221 of the second pixel region P2 may not be required to be formed at a distance such that the capacitances are not produced. Accordingly, aperture ratio can be improved.

The common line 205 may be arranged at a separate region between the second outermost electrode 231 of the first pixel region P1 and the first outermost electrode 221 of the second pixel region P2. In detail, the common lines 205 may be respectively spaced apart from both sides of the second data line DL2, may be parallel with the second data line DL2, and may be connected to each other between the upper portion 221a of the first outermost electrode 221 of the second pixel region P2 and the lower portion 231b of the second outermost electrode 231 of the first pixel region P1.

Because of this configuration of the common lines 205, even though a black matrix (e.g., 113 of the FIG. 4A example) may not be formed between the first and second pixel regions P1 and P2, light leakage at the separate region between the second outermost electrode 231 of the first pixel region P1 and the first outermost electrode 221 of the second pixel region P2 can be prevented by the common lines 205.

The common line 205 may be formed at the same layer and of the same material as the gate line GL. Accordingly, the black matrix can be eliminated, and production processes can be simplified and production costs can be reduced.

It will be apparent to those skilled in the art that various modifications and variations may be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. A liquid crystal display (LCD) device, comprising:
    a substrate;
    a gate line on the substrate;
    first and second data lines crossing the gate line to respectively define first and second pixel regions; and
    a plurality of first and second electrodes alternately arranged at each of the first and second pixel regions, each of the first and second electrodes including a plurality of bars, the plurality of first and second electrodes including a first and a second outermost electrode, wherein the first data line overlaps an upper portion of the first outermost electrode of the first pixel region, and is spaced apart from a lower portion of the first outermost electrode of the first pixel region, wherein the second data line is spaced apart from an upper portion of the second outermost electrode of the first pixel region, and overlaps a lower portion of the second outermost electrode of the first pixel region, and wherein the second data line overlaps an upper portion of the first outermost electrode of the second pixel region, and is spaced apart from a lower portion of the first outermost electrode of the second pixel region.

2. The device of claim 1, wherein:
the lower portion of the second outermost electrode of the first pixel region extends into the second pixel region; and
the upper portion of the first outermost electrode of the second pixel region extends into the first pixel region.

3. The device of claim 1, wherein:
the upper portion of the first outermost electrode has an area greater than that of the lower portion of the first outermost electrode; and
the lower portion of the second outermost electrode has an area greater than that of the upper portion of the second outermost electrode.

4. The device of claim 1, wherein each of the first and second electrodes are bent symmetrically with respect to a center of the first and second pixel regions.

5. The device of claim 2, further comprising a common line at a separate region between the second outermost electrode of the first pixel region and the first outermost electrode of the second pixel region.

6. The device of claim 5, wherein the common lines are:
respectively spaced apart from both sides of the second data line;
parallel with the data line; and
connected to each other between the upper portion of the first outermost electrode of the second pixel region and the lower portion of the second outermost electrode of the first pixel region.

7. The device of claim 1, further comprising:
a first thin film transistor connected to the gate line and the first data line, the first thin film transistor being configured to supply a first data voltage to the first electrode of the first pixel region; and
a second thin film transistor connected to the gate line and the second data line, the second thin film transistor being configured to supply a second data voltage, which has a level opposite to a level of the first data voltage, to the second electrode of the first pixel region.

8. The device of claim 7, further comprising:
a color filter on the first and second data lines,
wherein the first and second electrodes are on the color filter.

9. The device of claim 8, further comprising a nano capsule liquid crystal layer on the first and second electrodes.

10. The device of claim 9, wherein the nano capsule liquid crystal layer is a film type.

11. The device of claim 10, further comprising:
a first polarizing plate below the substrate, the first polarizing plate having a first polarization axis; and
a second polarizing plate on the nano capsule liquid crystal layer, the second polarizing plate having a second polarization axis perpendicular to the first polarization axis.

12. The liquid crystal display device of claim 5, wherein the common line is at a same layer and comprises a same material as the gate line.

13. The liquid crystal display device of claim 8, wherein:
an inter-layered insulating film is on the second data line; and
the color filter is on the inter-layered insulating film.

14. The liquid crystal display device of claim 13, wherein there is no black matrix between the inter-layered insulating film and the color filter.

15. The liquid crystal display device of claim 1, wherein the upper portion and lower portion of the first outermost electrode and the upper portion and lower portion of the second outermost electrode are respectively divided with respect to a center of the first and second pixel regions.

* * * * *